United States Patent [19]

Lang

[11] Patent Number: 4,819,061
[45] Date of Patent: Apr. 4, 1989

[54] RECOVERY OF LUMINANCE AND CHROMINANCE INFORMATION FROM AN ENCODED COLOR TELEVISION SIGNAL

[75] Inventor: Stuart E. Lang, Montville, N.J.

[73] Assignee: Dubner Computer Systems, Inc., Paramus, N.J.

[21] Appl. No.: 60,271

[22] Filed: Jun. 10, 1987

[51] Int. Cl.$^4$ ............................................. H04N 9/78
[52] U.S. Cl. ......................................................... 358/31
[58] Field of Search ........................................... 358/31

[56] References Cited

U.S. PATENT DOCUMENTS 4,352,122  9/1982  Reitmeier et al. ................. 358/31

FOREIGN PATENT DOCUMENTS

| | | | |
|---|---|---|---|
| 31287 | 2/1982 | Japan | 358/31 |
| 129890 | 8/1983 | Japan | 358/31 |
| 161484 | 9/1983 | Japan | 358/31 |
| 7287 | 1/1985 | Japan | 358/31 |
| 62292 | 4/1985 | Japan | 358/31 |
| 68792 | 4/1985 | Japan | 358/31 |
| 139090 | 7/1985 | Japan | 358/31 |

OTHER PUBLICATIONS

Maxemchuk et al, Separation of NTSC Signals by Minimum Mean Square Error Filters and Adaptive Filters, IEEE Transactions on Communications, vol. COM-26, No. 5, May 1978 pp. 583-593.

*Primary Examiner*—John W. Shepperd
*Attorney, Agent, or Firm*—Francis I. Gray

[57] ABSTRACT

An apparatus and method for decoding an encoded video signal combs a two dimensional array of pixels from a single field of the encoded video signal according to selected weighting factors to obtain a weighted average chrominance value. The weighted average chrominance value is subtracted from the encoded value to obtain an initial luminance value. The initial luminance value is corrected for residual chrominance errors that exist at edges in the picture represented by the encoded video signal. The luminance correction is based upon the chrominance difference across the edge and upon the orientation of the edge. The corrected luminance value may then be subtracted from the corresponding encoded video value to obtain a corrected chrominance value.

6 Claims, 10 Drawing Sheets

| | A | C | E | G | I |
|---|---|---|---|---|---|
| 1 | +1 | −2 | +2 | −2 | +1 |
| 2 | −4 | +8 | −8 | +8 | −4 |
| 3 | +6 | −12 | +12 | −12 | +6 |
| 4 | −4 | +8 | −8 | +8 | −4 |
| 5 | +1 | −2 | +2 | −2 | +1 |

|   | A | B | C | D | E | F | G | H | I |
|---|---|---|---|---|---|---|---|---|---|
|   | Y+C1 | Y−C2 | Y−C1 | Y+C2 | Y+C1 | Y−C2 | Y−C1 | Y+C2 | Y+C1 |

|   | A | C | E | G | I |
|---|---|---|---|---|---|
| 1 | Y+C1 | Y−C1 | Y+C1 | Y−C1 | Y+C1 |
| 2 | Y−C1 | Y+C1 | Y−C1 | Y+C1 | Y−C1 |
| 3 | Y+C1 | Y−C1 | Y+C1 | Y−C1 | Y+C1 |
| 4 | Y−C1 | Y+C1 | Y−C1 | Y+C1 | Y−C1 |
| 5 | Y+C1 | Y−C1 | Y+C1 | Y−C1 | Y+C1 |

FIG. 2

|   | A | C | E | G | I |
|---|---|---|---|---|---|
| 1 | +1 | −2 | +2 | −2 | +1 |
| 2 | −2 | +4 | −4 | +4 | −2 |
| 3 | +2 | −4 | +4 | −4 | +2 |
| 4 | −2 | +4 | −4 | +4 | −2 |
| 5 | +1 | −2 | +2 | −2 | +1 |

|   | A | C | E | G | I |
|---|---|---|---|---|---|
| 1 | +1 | −2 | +2 | −2 | +1 |
| 2 | −4 | +8 | −8 | +8 | −4 |
| 3 | +6 | −12 | +12 | −12 | +6 |
| 4 | −4 | +8 | −8 | +8 | −4 |
| 5 | +1 | −2 | +2 | −2 | +1 |

STAGE 7: H OR V FILTER SELECTION

FIG. 6A

STAGE 2: HORIZONTAL COMBING

FIG. 6B

STAGE 3: LUMA CLIPPING

STAGE 6: CHROMA DIFFERENCE WEIGHTING

FIG. 6F

RECOVERY OF LUMINANCE AND CHROMINANCE INFORMATION FROM AN ENCODED COLOR TELEVISION SIGNAL

BACKGROUND OF THE INVENTION

The present invention relates to television composite video decoders, and more particularly to an improved television composite video decoder for recovering luminance and chrominance information from an encoded color television signal by decoding each pixel in the same manner using a weighting technique which includes the pixels surrounding the pixel being decoded.

Figure 1:
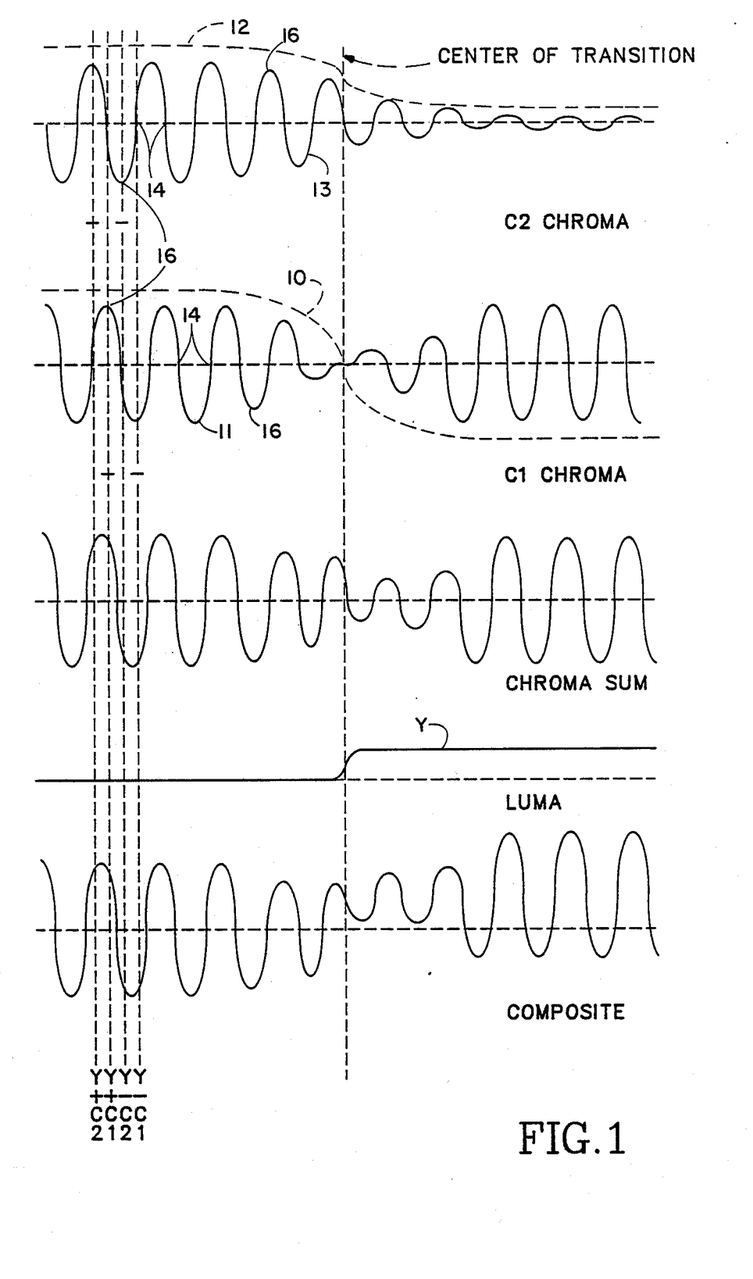
FIG. 1 illustrates the generation of a composite video signal across a transition in a scene.

A video encoder, such as an NTSC encoder, typically receives signals representing the instantaneous magnitudes of red, green and blue light received by a television camera, or other component video device, as an image is scanned. These three signals are combined to produce a luminance signal referred to as "Y". The luminance signal describes the brightness of the image. Also produced are two signals that are used to describe the color characteristics of the image, the chrominance signals. In the NTSC encoding scheme these chrominance signals are referred to as "I" and "Q", and in the PAL format the somewhat different chrominance signals are referred to as "U" and "V". Regardless of the encoding scheme, or format, the chrominance signals will be referred to generically as Chroma 1 (C1) and Chroma 2 (C2). The C1 and C2 signals are limited in frequency to a maximum of 1.5 MHz. A reference sine wave signal, called the subcarrier, also is received by the video encoder. From the subcarrier signal the video encoder creates two sine waves of the subcarrier frequency that are in quadrature, i.e., having a phase difference of ninety degrees between the two sine waves. As shown in FIG. 1 the C1 signal 10 modulates the amplitude of one sine wave 11 and the C2 signal 12 modulates the amplitude of the other sine wave 13. The two modulated sine waves, C1 CHROMA and C2 CHROMA, are summed to create the chrominance signal, CHROMA SUM. This process of encoding the chrominance signal commonly is known as "quadrature amplitude modulation." Finally the chrominance signal is summed with the luminance (LUMA) signal Y to form a COMPOSITE video signal.

There are four very significant points in each cycle of each sine wave. The first two points are the two zero crossings 14. Regardless of the amplitude of the controlling chroma signal, the modulated signal is zero at these points in time. The other two significant points are the peaks 16 of the sine waves. The magnitude of the positive and negative peaks with respect to zero is the magnitude of the controlling chroma signal. Positive peaks indicate the C1 or C2 values, while negative peaks indicate the −C1 or −C2 values. Since C1 and C2 can be positive or negative themselves, a negative chroma signal value inverts the peaks. Further since the two original sine waves are in quadrature, when one is at a peak the other is at zero. By sampling the encoded chrominance signal at four times the subcarrier frequency at the proper phase, every four samples produce +C2, +C1, −C2, −C1. The C2 samples fall between the C1 samples and each alternate between positive and negative samples. Since the encoded composite video signal includes the luminance signal Y, sampling at four times subcarrier frequency results in samples, or pixels, of Y+C2, Y+C1, Y−C2, Y−C1. The problem for a video decoder is to take these sums and determine how much of each sum is due to the chrominance signal and how much is due to the luminance signal.

Figure 3A:
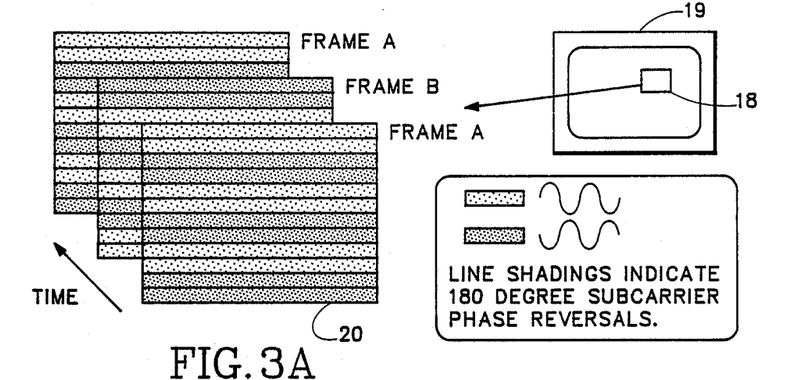
FIGS. 3A and 3B illustrate the chroma phase relationships between frames, fields and lines.
Figure 3B:
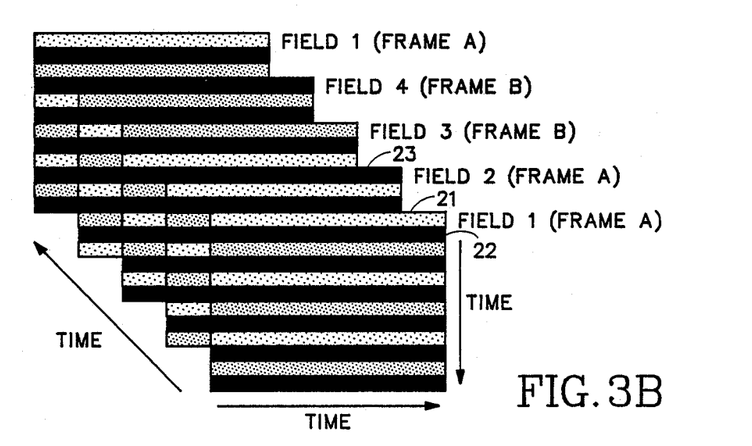

In the overall picture as shown in FIGS. 3A and 3B, which represents a small section 18 of a television screen 19, a video frame 20 has two interlaced video fields 21, 23 with the phase of the subcarrier frequency reversing from line to line within each field. Successive video frames 20 also have the phase of the subcarrier frequency reversed so that the corresponding lines of the same video field, 21 or 23, from frame to frame have the opposite subcarrier phase. The black lines 22 in the video fields 21, 23 of FIG. 3B indicate the lines which are provided by the opposite video field to make up the video frame 20. Looking at the pixels within one field, a pixel which contains a Y+C1 sum will have pixels above and below in the same field with Y−C1 sums. The corresponding pixel in the next and previous frames will contain a Y−C1 sum. Further looking only at the C1 pixels, the pixels in the same line on either side of the pixel containing the Y+C1 sum contain Y−C1 sums.

With this basic understanding of the operation of a video encoder many schemes have been used over the years to recover luminance and chrominance information from the composite video signal. A common scheme still employed in many color television receivers is to use a band pass filter centered at the subcarrier frequency to recover the chrominance information. The filter typically has a bandwidth of approximately 1.0 MHz. The luminance information is recovered by using a notch filter to delete the chrominance band, leaving high and low frequency luminance. The problems with this and similar approaches are that (a) luminance information near the subcarrier frequency is lost, (b) some luminance information near the subcarrier frequency is misinterpreted as chrominance, and (c) high frequency chrominance components bypass the notch filter and appear as luminance, producing an annoying "crawl" at extreme color transitions within the picture.

A more sophisticated approach involves what is known as comb filtering. In its simplest form a delay line with a delay equal to one horizontal line is used. This makes it possible to have pixels from two consecutive lines within a field at the same horizontal position available simultaneously. If a given pixel is currently available, the delay line provides a corresponding pixel from the previous line in the same column. If the prior pixel is a Y+C1 sum, the current pixel is a Y−C1 sum. Adding the two pixels together cancels the C1 term, leaving 2Y from which the luminance component Y is obtained by dividing by two. Likewise subtracting the two pixels from each other and dividing by two results in obtaining C1. The problem with this technique is that an assumption is made that the Y and C values have not changed very much from one line to the next. The greater the change, the greater the error In order to improve the results a narrow band subcarrier notch filter is placed in the luminance channel. The chrominance information is filtered to remove high frequency components. These high frequency components may be restored to the luminance channel in some designs. An improved version of this method uses two delay lines, combining the pixels from the prior and current lines, combining the pixels from the current line and the next line, combining the two resultants and dividing by four. This tends to reduce errors, but does not eliminate them. There are many variations of the above schemes, but all produce significant errors.

Another major decoding scheme is the adaptive comb filter. Basically decisions are made as to whether the vertical comb filtering described above should be enabled or not. If it appears that there is a great deal of change from line to line, vertical combing is disabled. Since the subcarrier phase reverses from frame to frame, if a given pixel is Y+C1 in a prior frame, it is Y−C1 in the current frame. Again if it appears that there is a great deal of change from frame to frame, this combing is disabled. This frame combing requires up to two frames of delay if combing is to be performed both forward and backward in time. It is apparent that combing may be performed in any direction: up, down, left, right, forward or backward. However this approach has two flaws. The first flaw relates to picture content. If there is motion in the scene, or picture image, each frame is different and frame combing produces errors. Within a field transitions may be vertical, horizontal or a combination thereof. In fact it is possible to have a single pixel that does not match any surrounding pixel in terms of Y and/or C values. The second flaw lies in the decision making process. Since the direction in which to comb is determined by the Y and C values which are unknown until decoded, the "solution" is to comb in all directions, vertically, horizontally and frame to frame, and look for a match between any two of them. However thin diagonal lines in the picture can trick the decoder into combing incorrectly. The result can be a significant loss of detail. Further usually none of the three comb values will be the same. Averaging of the closest pair cf comb values still provides the wrong answer, but hopefully not too wrong. Again there is a loss of fine detail in the picture. And when there is motion, frame to frame decoding must be disabled, forcing the video decoder to rely only on the current field information.

However, until now the adaptive comb filters have produced the best results by attempting to extract luminance and chrominance values using those pixels judged to be closest in value to the pixel being decoded. Since the decision making process is flawed, and because the surrounding pixels are not always close enough in value to provide an accurate decode, the resulting picture exhibits a visible loss of fine detail as well as crawl at the edges of brightly colored objects.

What is desired is a video decoder to more accurately decode luminance and chrominance information from an encoded television signal without the requirement of a decision making process and regardless of the motion within a picture.

SUMMARY OF THE INVENTION

Accordingly the present invention provides a method for recovering luminance and chrominance information from an encoded television signal by combing within the current field over a limited area surrounding a pixel being decoded. Only the pixel being decoded and the surrounding pixels having the same chrominance component are used, and a weighting factor pattern is applied to the pixels being used. Each pixel is multiplied by its own weighting factor, the resulting values are then summed, and the resulting sum is divided by the sum of the absolute values of the weighting factors. Due to the spatial distribution of the pixels, the number of pixels, and the interleaving of positive and negative weighting factors, the sum of the luminance values is reduced essentially to zero, and the chrominance values all end up with the same polarity as the center pixel. The resulting averaged chrominance value is subtracted from the original pixel value to obtain the luminance value for that pixel.

Using luminance and chrominance values related to the same chrominance component as the pixel being decoded, i.e., the center pixel, obtained as described above, a first luminance correction value is generated by band pass filtering the luminance vertically. A clipping value is obtained by weighting the magnitude of the difference between the chrominance values of the pixels to the left and right of the center pixel. This clipping value limits the magnitude of the first luminance correction value. Second and third luminance correction values are similarly generated by band pass filtering the luminance horizontally. Two different clipping values are obtained based upon the magnitudes of vertical changes in chrominance values. Each clipping value is weighted by a different factor. The clipping values individually limit the magnitudes of the second and third luminance correction signals. One of the three luminance correction values is selected by comparing the magnitudes of the three related chrominance differences. The selected correction value is then subtracted from the luminance value of the center pixel, producing the final corrected luminance value.

The objects, advantages and novel features of the present invention will be apparent from the following detailed description when read in conjunction with the appended claims and attached drawing.

DESCRIPTION OF THE PREFERRED EMBODIMENT

Figure 2:
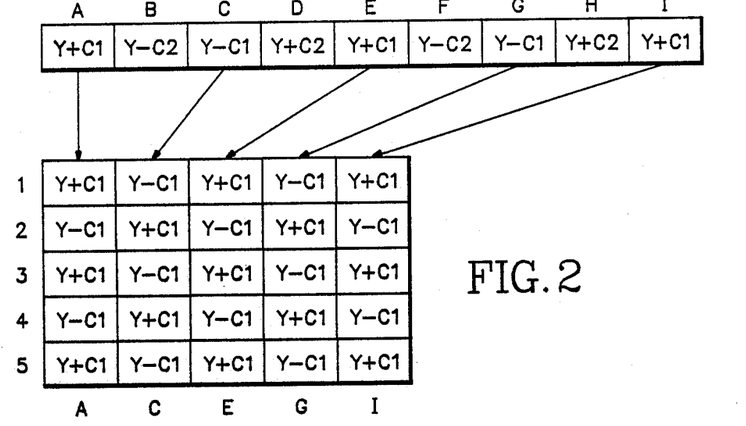
FIG. 2 illustrates the selection of an array of pixels from a field, all pixels selected having the same chroma component.

The first step in decoding a composite video signal is to obtain luminance and chrominance values that are as accurate as possible. All of the information used to decode a pixel comes from the same field as that pixel, eliminating motion-related problems, and every pixel is decoded in exactly the same manner. The luminance/chrominance separation process does not require knowledge as to whether a value is Y+C1, Y+C2, Y−C1 or Y−C2. For purposes of illustration the extraction of chrominance and luminance from an NTSC composite signal is described which combs over an area five lines high by nine pixels wide as illustrated in FIG. 2. Since alternate pixels have the same chroma component, the pixels indicated by A, C, E, G and I form the horizontal axis of the processing array and five consecutive lines in the same field form the vertical axis of the array. A chrominance value is to be obtained for the center pixel, designated E3.

Figure 4A:
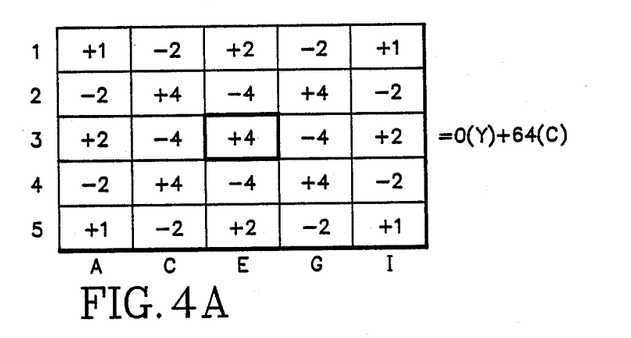
FIGS. 4A and 4B illustrate alternative weighting factors for the array of FIG. 2 according to the present invention.
Figure 4B:
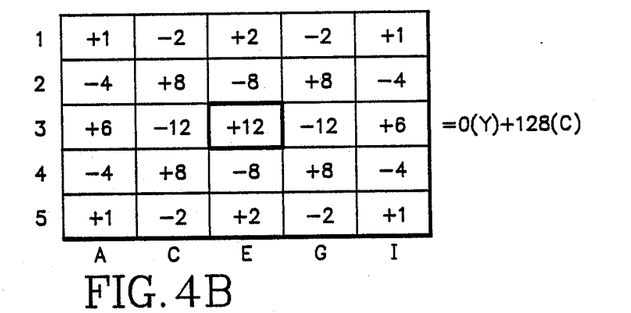

Referring now to FIG. 4A a weighting factor is assigned to each pixel in the array and is used as a multiplier for the pixel at that location. The values for the weighting factors provide greatest weight to the center pixels. The magnitudes and polarities of the weighting factors are such that when all the pixels in the array are weighted and summed, the luminance component is reduced essentially to zero. Looking at the +C and −C values for the given weighting factors the result is that all weighted pixels have the same polarity as the C value in the center. For this example the magnitude obtained is 64C. Division by 64 yields a C value of the same polarity and type, C1 or C2, as the C value in the center pixel E3. Any residual luminance is reduced by the same factor. The result is an average chroma value for the center pixel E3. Finally the luminance of the center pixel E3 is obtained by subtracting the average chroma value from the total value for the center pixel. FIG. 4B illustrates a different weighting scheme which provides the same results for most pixels, and has a division factor of 128.

The second step of the decoding process uses the luminance and chrominance values obtained from the weighting scheme of FIG. 4B. The purpose of this second step is to correct for errors in the luminance values. Basically there are two causes of errors in the decoded chrominance values, and therefore in the decoded luminance values obtained in the first step. Most of the pixels within any picture lie within areas of relatively constant chrominance. These areas occasionally contain luminance changes of great magnitude at frequencies near or at the subcarrier frequency. Such changes can produce errors in the chrominance and luminance values obtained in the first step. These errors are generally limited to areas of just a few pixels and are of small magnitude, making them extremely difficult to see, even if left uncorrected. The second cause of errors is the transition from one color to another. This error produces the annoying "crawl" commonly seen on the edges of brightly colored areas when watching television. The magnitude of the crawl is influenced by the magnitude, sharpness and orientation of the transition. Sharp transitions of great magnitude produce the most crawl. Horizontal edges produce greater crawl because video encoders do not filter the chrominance vertically. These factors, along with the weighting scheme of FIG. 4B, are all accounted for when correcting the luminance. The result is that corrections are limited in magnitude and re only made where actually needed, thus eliminating crawl while preserving detail.

Figure 5A:
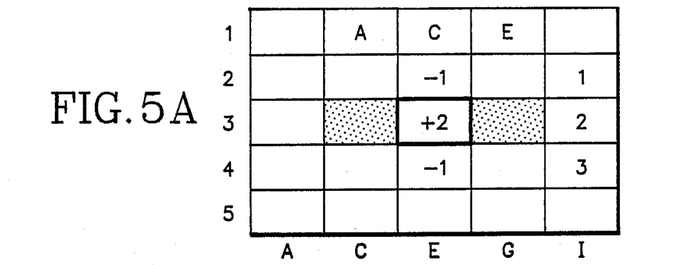
FIGS. 5A, 5B and 5C illustrate luminance correction according to the present invention.

Changes along a line are caused by edges that are not entirely horizontal. This does not present a problem except for large changes in chrominance values. Where there is an edge an error can occur. The magnitude of the error is related to the degree to which the edge is vertical, the more vertical the smaller the error, and the magnitude of the difference between the two colors, the smaller the difference the smaller the error. FIG. 5A shows how the chrominance change along a line is determined. The chrominance change for pixel E3 is the absolute value of the difference between the chrominance values obtained for pixels C3 and G3:

Chroma Diff=\C3C−G3C\ where C3C is the chrominance value for pixel C3 and G3C is the chrominance value for pixel G3. The errors that are produced are in the vertical direction, i.e., a vertical chrominance signal within the luminance. The value of this chrominance signal is obtained by band pass filtering the luminance signal vertically according to the formula:

Luma's Chroma=(2(E3Y)−E2Y−E4Y)/4 where E3Y is the luminance value for pixel E3, E2Y is the luminance value for the pixel E2 and E4Y is the luminance value for the pixel E4. Based upon the characteristics of the filter of FIG. 4B as well as the horizontal chrominance filtering characteristics of the NTSC encoder, two clipping values for Luma's Chroma are obtained:

Clip Mag=+/−0.375(Chroma Diff).

Although the true clipping multiplier is approximately 0.4, ⅜ is easier to handle digitally and is close enough. The actual luminance error cannot exceed this magnitude. The value finally obtained for correcting luminance is limited in magnitude to the lesser of the Luma's Chroma or the Clip Mag. For example, if Luma's Chroma equals −5 and the Clip Mag equals 4, the Luma's Chroma is clipped to −4; and if Luma's Chroma equals +2, it remains +2 since the magnitude is less than 4. Clipping serves to reduce the potential for over-correcting the luminance signal, which can reduce picture detail.

Figure 5B:
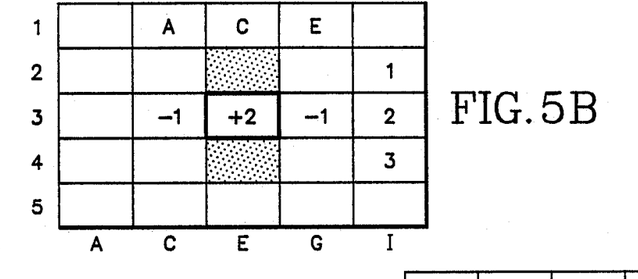

Besides the Chroma Diff and clipped Luma's Chroma for chrominance changes along a line, two more Chroma Diff and clipped Luma's Chroma pairs need to be obtained related to line to line changes. Referring now to FIG. 5B the Chroma Diff is obtained:

Chroma Diff=\E2C−E4C\ and the Luma's Chroma is obtained:

Luma's Chroma=(2(E3Y)−C3Y−G3Y)/4.

The multiplier for Clip Mag is ¾, the closest practical value to 0.8, which is based upon the filter of FIG. 4B and the fact that the encoder does not filter vertically:

Clip Mag=0.75(Chroma Diff).

Figures 5C, 6G:
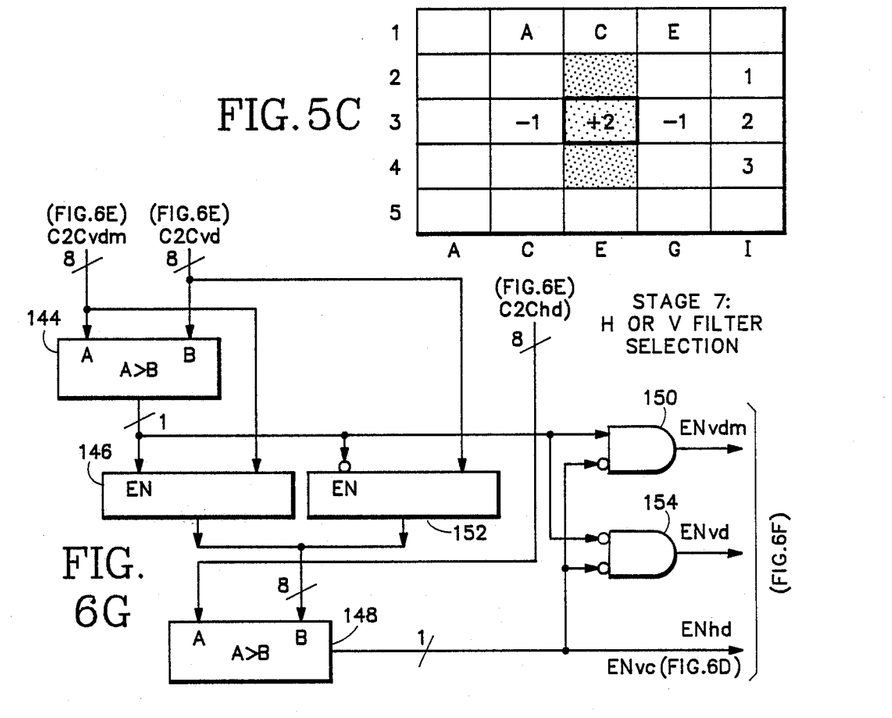
FIGS. 6A, 6B, 6C, 6D, 6E, 6F, 6G and 6H are a block diagram of an apparatus for performing the decoding according to the present invention.

Due to the lack of vertical filtering of the chrominance in the encoded signal, it is possible that the chrominance of a pixel does not lie between the values for pixels on the lines above and below. As shown in FIG. 5C the Chroma Diff in this case is obtained by finding the difference between the chrominance of the center pixel E3 and the average of the chrominance of the pixels E2 and E4:

Chroma Diff=\E3C+(E2C+E4C)/2\.

The addition of E3C to the average of E2C and E4C is to account for the fact that E3C is of opposite polarity to E2C and E4C due to phase reversal as previously discussed. Luma's Chroma is the same as for FIG. 5B, but the clip multiplier is 5.0:

Clip Mag=5.0(Chroma Diff).

The vertical weighting of the filter in FIG. 4A hides this Chroma Diff, which is why the filter of FIG. 4B is used where the use of this second step is desired.

With the three pairs of Chroma Diff and clipped Luma's Chroma a choice is made between the pairs obtained according to FIGS. 5B and 5C. If the Chroma Diff from FIG. 5C is greater than that obtained from FIG. 5B, then the values from FIG. 5C are selected, otherwise the values from FIG. 5B are selected. The selected pair is then compared with the pair from FIG. 5A. If the Chroma Diff from FIG. 5A is greater, then the clipped Luma's Chroma from FIG. 5A is selected, otherwise the clipped Luma's Chroma from the selected pair is selected. The final filtered luminance value is the luminance value of the center pixel E3 minus the selected Luma's Chroma.

Due to the action of the filter of FIG. 4B the Chroma Diffs are smaller than the actual differences between the true chroma values, and the Clip Mags are fractions of the Chroma Diffs in the first two cases, FIGS. 5A and 5B. And although the multiplier in the third case is large, the resulting Clip Mag is generally quite small, in fact generally the smallest of the three. The Luma's Chroma is often smaller than the associated Clip Mag, and the selected Clip Mag is generally zero, clipping the associated Luma's Chroma to zero. Therefore only a very few pixels within a field are actually filtered in this step. The changes that do occur are limited in magnitude, minimizing the possible smear of detail near edges; and crawl at edges is effectively eliminated with practically no sacrifice in detail. Areas of relatively constant chrominance occupy far more picture area than the edges between them, and virtually no detail is lost in these areas since this second step does not filter in these areas.

At this point a very accurate luminance signal has been obtained The chrominance signal which was obtained in the first step per FIG. 4B, is an average chrominance value. Horizontally the chrominance bandwidth, which was initially limited by the encoder has been further reduced only slightly. The vertical chrominance bandwidth, which was not limited by the encoder, has been reduced. If the luminance and chrominance signals are to be recombined, as in a "still store" type device, the vertical chrominance bandwidth reduction is beneficial, as it reduces the crawl observed on horizontal edges on television sets equipped with vertical comb filters. Crawl also is reduced slightly on vertical edges, with no visible reduction in chrominance bandwidth. As previously noted, edges between objects of different chrominance values constitute a very small percentage of a picture. Pictures consist of areas of very low bandwidth chrominance, and within these areas the chrominance averaging provided by the filter illustrated in FIG. 4B has the beneficial effect of eliminating chrominance noise. However a chrominance signal of the original encoded bandwidth may be obtained, if desired, by subtracting the very accurate luminance signal from the original encoded pixel value. The best approach is to make use of both chrominance signals. Since the lower bandwidth signal is free of noise, it makes sense to use it everywhere except at the edges. At edges the higher bandwidth signal can be substituted. The chrominance bandwidth reduction is only significant at horizontal edges. Therefore switching to the higher bandwidth chrominance signal is done only at horizontal edges This is accomplished by switching to the higher bandwidth chrominance signal when the Chroma Diff obtained in FIG. 5B is the greatest of the three and the associated clipped Luma's Chroma is greater than zero, indicating the presence of a horizontal edge.

Figure 6A:
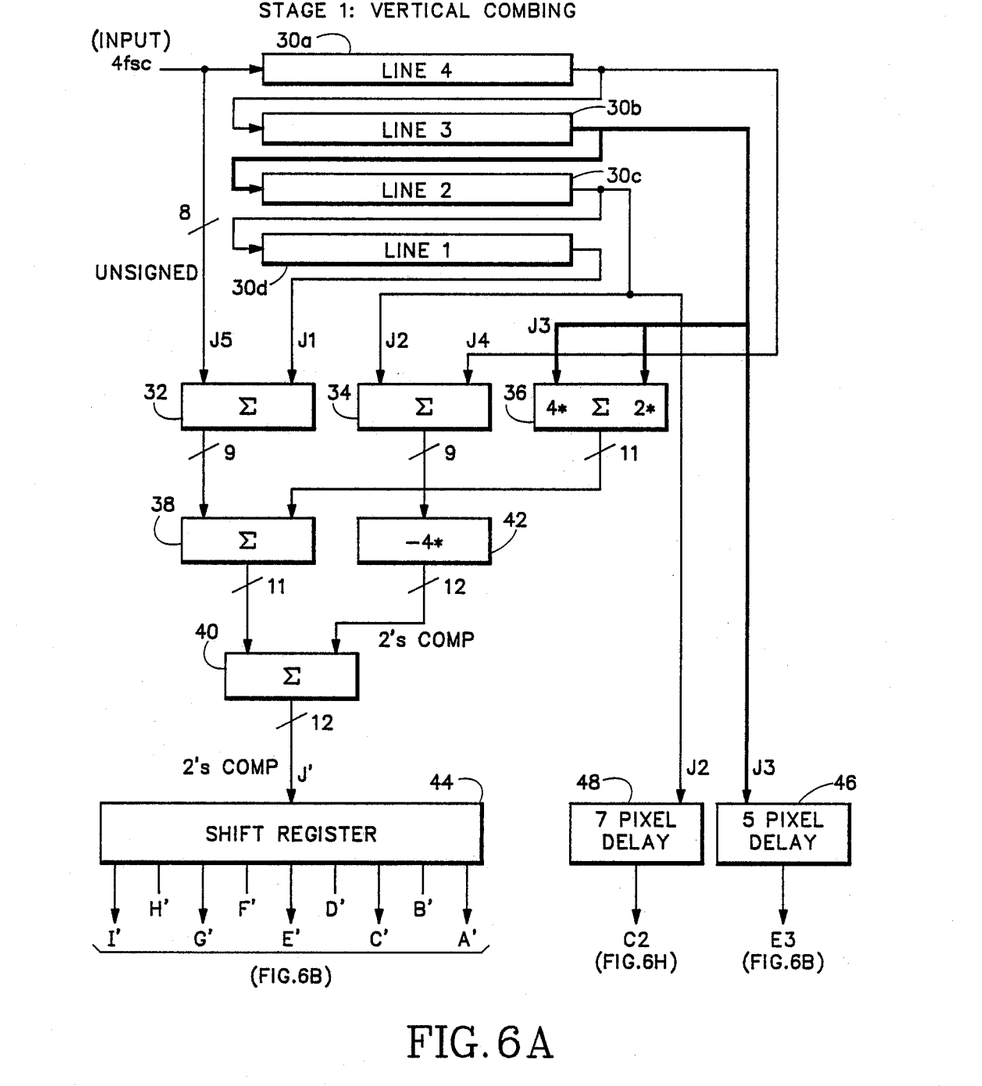

Referring now to FIGS. 6A, 6B, 6C, 6D, 6E, 6F, 6G and 6H a digital hardware implementation for the process described above is shown, which also can be implemented in software or in analog hardware as well as for other television standards such as PAL. In FIG. 6A the input video, sampled at four times subcarrier frequency and converted to digital data, is input to a series of delay lines $30a$–$30d$ each having a delay period equal to one horizontal video line of data to provide vertical combing. The outputs of the delay lines $30a$–$30d$ are combined with each other and with the current data in a plurality of summers 32–40. The first summer 32 combines the oldest data line J1 with the current data line J5, the second summer 34 combines the next oldest data line J2 with the next current data line J4, and the third summer combines the middle data line J3 in a multiplicative manner to produce a multiplication of six. The outputs of the first and third summers 32, 36 are combined by the fourth summer 38, the output of which is combined with the output of the second summer 34, after being multiplied by minus four in a multiplier 42, in fifth summer 40. The output of the last summer 40 is input to a shift register 44 which is nine pixels in length. Output from the shift register 44 are the alternate weighted pixels A', C', E', G' and I' which have the same chroma component as discussed above. Looking at pixel E' the value is given by:

$$
\begin{array}{r}
+1(Y + C)\ E5 \\
-4(Y - C)\ E4 \\
+6(Y + C)\ E3 \\
-4(Y - C)\ E2 \\
+1(Y + C)\ E1 \\
\hline
+16\ C\ E'
\end{array}
$$

The output of the delay line $30b$ for data line J3 is input to a five pixel delay line 46 to provide pixel E3, and the output of the delay line $30c$ for data line J2 is input to a seven pixel delay line 48 to provide pixel C2.

Figure 6B:
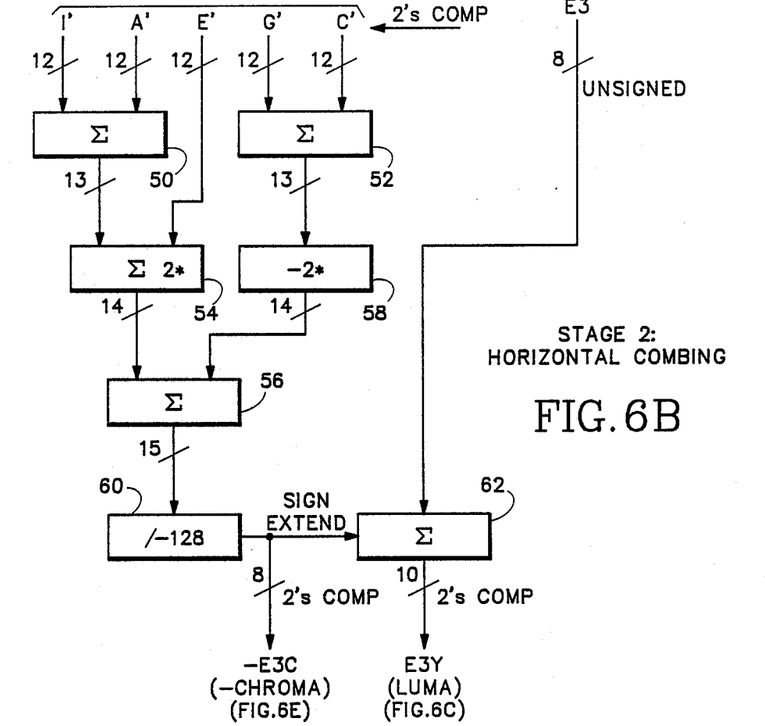

The weighted pixels A', C', E', G' and I' are input to a second plurality of summers 50–56 as shown in FIG. 6B for horizontal combing. Pixels A' and I' are combined in first summer 50, the output of which is combined with twice pixel E' in third summer 54. Pixels C' and G' are combined in second summer 52, the output of which is multiplied by minus two in multiplier 58. The outputs of the third summer 54 and the multiplier 58 are combined in the fourth summer 56. At this point the weighted value for the center pixel E3 is given by:

$$
\begin{array}{r}
+1(Y + C)\ I' \\
-2(Y - C)\ G' \\
+2(Y + C)\ E' \\
-2(Y - C)\ C' \\
+1(Y + C)\ A' \\
\hline
+8\ C(E') = 8\ C*16\ C = 128\ C
\end{array}
$$

which corresponds to the five line by nine pixel combing described above with respect to FIGS. 4A and 4B, the weighting of this circuit corresponding to that indicated particularly by FIG. 4B. The output from the fourth summer 56 is input to a divider 60 where the weighted pixel value is divided by minus 128 to produce the chroma −E3C for the center pixel E3. The chroma −E3C is combined with the actual center pixel value E3 in summer 62 to produce the luma value E3Y for the pixel E3. This completes the first step of the filter according to the present invention and in many cases is sufficient to provide an improved decoding of the video input signal.

Figure 6C:
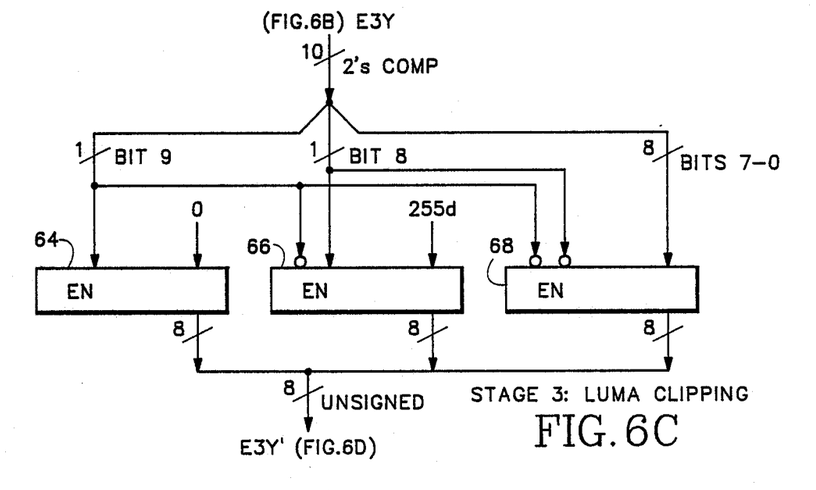

As shown in FIG. 6C the luma value E3Y is input to three gates 64, 66, 68 which are exclusively enabled according to the most significant bits of the luma value. If the most significant bit is one, this indicates a black pixel and the first gate 64 is enabled. Enabling of the first gate 64 clips the luma value to zero. If the most significant bit is zero and the next most significant bit is one, this indicates a maximum white pixel and the second gate 66 is enabled. Enabling of the second gate 66 sets the luma value to maximum. Finally when both of the most significant bits of E3Y are zero, the usual situation, the third gate 68 is enabled and the value for E3Y is passed directly to the output. The clipped luma value E3Y' from these gates 64, 66, 68 is further processed as described below to eliminate the effect of any residual chroma errors due to edges in the picture as described above.

Figure 6D:
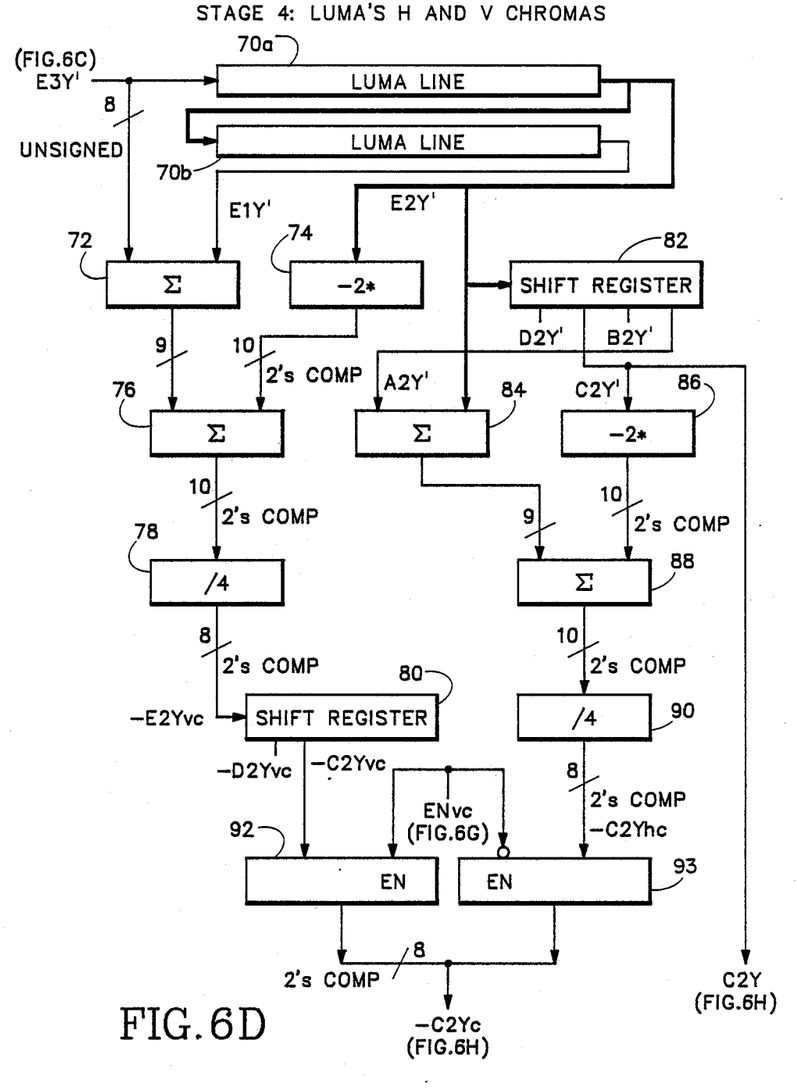

Referring back to FIGS. 5A, 5B and 5C the letters A, B, C and numerals 1, 2, 3 inside the array indicate the transformation performed by the hardware of FIG. 6 to determine the Chroma Diff, Luma's Chroma and Chroma Mag for the three cases shown since only a three by three array is used for these determinations. Therefore, in FIG. 6D the horizontal and vertical Luma's Chromas are determined from the E3Y' clipped luminance data. The E3Y' data is input to two serial delay lines 70a, 70b. The output from the first delay line 70a becomes the center line, or line two, data in the transformed nomenclature so that the central pixel is on line two, column C. The delay lines 70a, 70b provide vertical luminance combing and the oldest luminance data E1Y' from delay line 70b is combined with the current luminance data E3Y' in a first summer 72, and the output from the first summer is combined with the middle luminance data E2Y' from delay line 70a after being multiplied by minus two by a multiplier 74 in a second summer 76. The result from the second summer 76 is divided by four by divider 78 to provide a vertical chroma component for luma, −E2Yvc, equal to:

$$-E2Yvc = (E1Y' + E3Y' - 2E2Y')/4$$

which is equivalent to the equation for Luma's Chroma associated with FIG. 5A. −E2Yvc is input to a shift register 80 to produce −C2Yvc, the vertical Luma's Chroma for the three by three array indicated in FIG. 5A. Likewise E2Y' is input to a second shift register 82 to perform the transformation to C2Y' and to obtain the pixel A2Y' on the other side horizontally of C2Y'. E2Y' and A2Y' are combined in summer 84, the output of which is combined with −2C2Y' from multiplier 86 in summer 88. The output of summer 88 is divided by four in divider 90 to produce −C2Yhc, the horizontal Luma's Chroma given by:

$$-C2Yhc = (A2Y' + E2Y' - 2C2Y')/4$$

which is equivalent to the Luma's Chroma associated with FIGS. 5B and 5C. The two Luma's Chromas, −C2Yvc and −C2Yhc, are input to respective gates 92, 93 which are enabled by an enable vertical chroma ENvc signal to be described below. The state of the ENvc signal determines which Luma's Chroma, vertical or horizontal, is to be used as the selected Luma's Chroma −C2Yc.

Figure 6E:
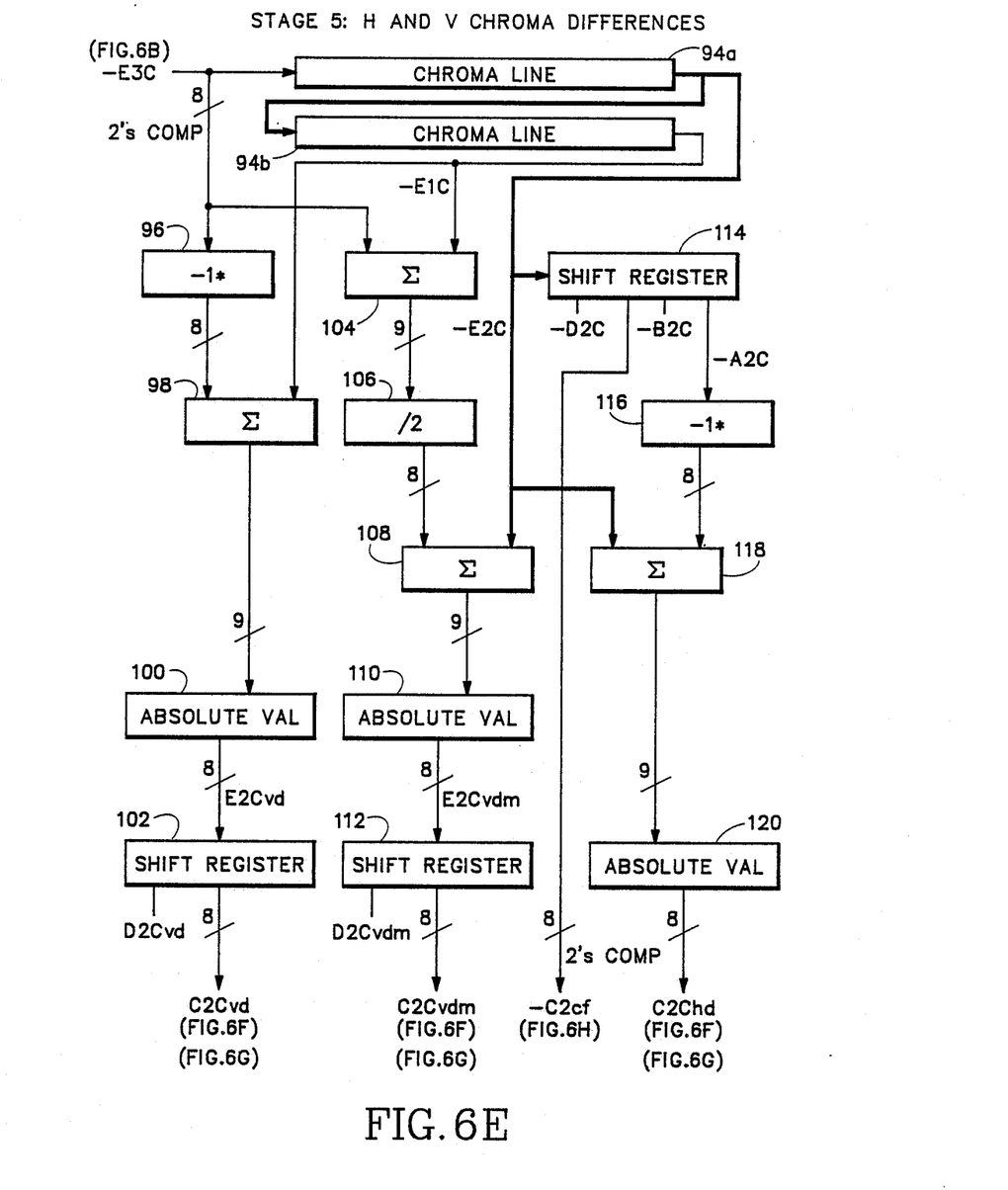

In like manner as illustrated in FIG. 6E the vertical and horizontal chroma differences are determined from the chroma value −E3C of step one. −E3C is input to two serial delay lines 94a, 94b. −E3C via two's complementer 96 is subtracted from −E1C in summer 98, with the result being converted to an absolute value by two's complementing negative values in circuit 100 to produce a chroma vertical difference E2Cvd equal to:

\E3C−E1C\ which is equivalent to the Chroma Diff for FIG. 5B. E2Cvd is transformed to C2Cvd by shift register 102. −E3C is averaged with −E1C via summer 104 and divider 106, and then added to −E2C in summer 108. The absolute value is obtained by circuit 110 to produce the modified vertical chroma difference E2Cvdm which is transformed to C2Cvdm by shift register 112. C2Cvdm is:

\C2C+(C1C+C3C)/2\ which is equivalent to the Chroma Diff for FIG. 5C. A shift register 114 converts −E2C into a center chroma value −C2cf and obtains −A2C which is two's complemented by circuit 116 and combined with −E2C in summer 118. The absolute value of the output of summer 118 from circuit 120 is the horizontal Chroma Diff C2Chd, given by:

\A2C−E2C\ which is equivalent to the Chroma Diff for FIG. 5A.

Figure 6F:
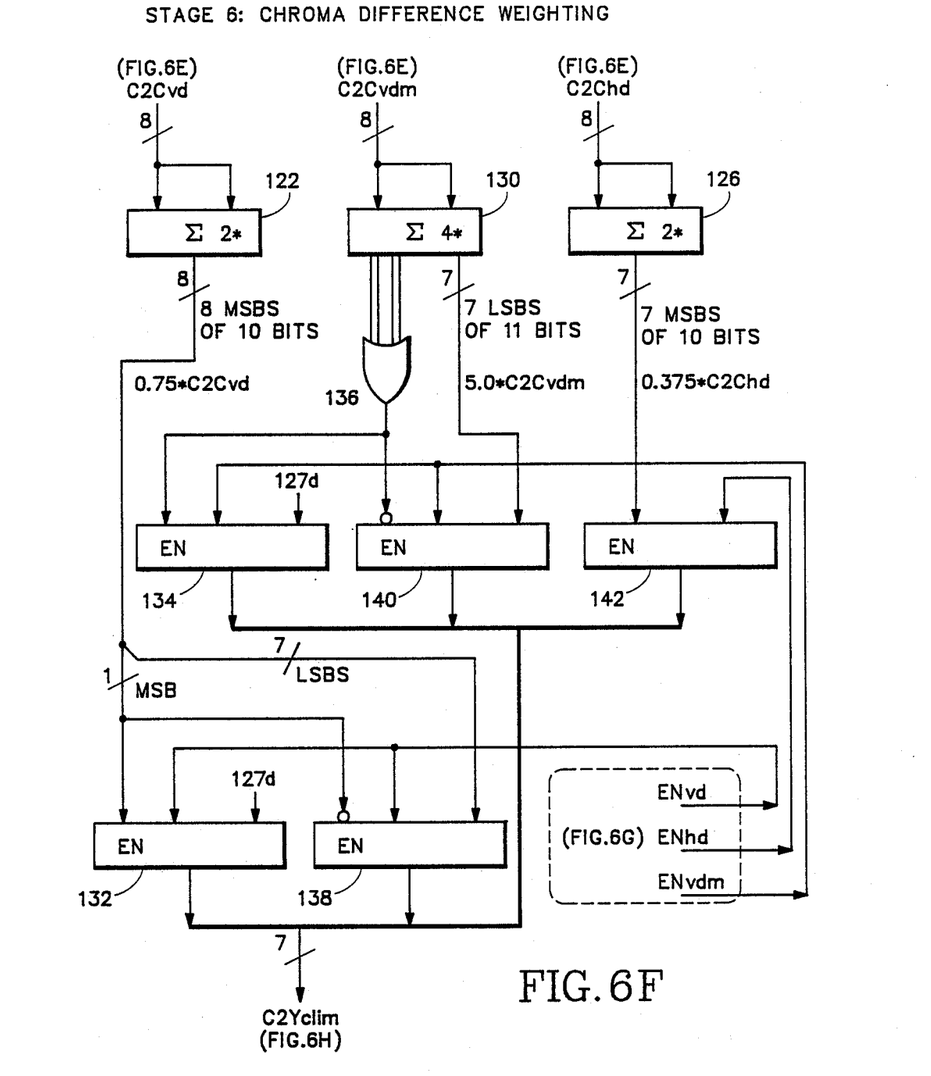

FIG. 6F illustrates the determination of the Clip Mag values from the Chroma Diffs. C2Cvd is input to a summer 122 which is essentially a three times multiplier, the output of which is divided by four by using the most significant bits, i.e., dropping the two least significant bits, to produce 0.75C2Cvd, or 0.75(Chroma Diff). Likewise C2Chd is multiplied by three and divided by eight by summing in the summer 126 and dropping the three least significant bits to produce 0.375C2Chd, or 0.375(Chroma Diff). Finally C2Cvdm is essentially multiplied by five in summer 130 to produce 5C2Cvdm, or 5(Chroma Diff). The 0.75C2Cvd and 5C2Cvdm outputs are limited to one-half of maximum value by gates 132, 134 respectively. The most significant bit(s), via OR gate 136 for 5C2Cvdm, enable the gates 132, 134 when the input value is greater than one-half maximum and outputs a value equal to one-half maximum. Otherwise gates 138, 140 are enabled to pass the actual value. These gates 132 and 138, 134 and 140, and gate 142 at the output of summer 126 are exclusively enabled for output by enable commands ENvd, ENhd and ENvdm, described below, to provide a Luma's Chroma limit value C2Yclim.

The enable commands are generated from the values of C2Cvd, C2Cvdm and C2Chd as shown in FIG. 6G. C2Cvdm is compared with C2Cvd in a first comparator 144. If C2Cvdm is greater than C2Cvd, then the output of the comparator 144 enables a gate 146 to pass C2Cvdm to a second comparator 148 and enables an AND gate 150. Otherwise a second gate 152 is enabled to pass C2Cvd to the second comparator 148 and a second AND gate 154 is enabled. C2Chd is compared with the selected C2Cv component from gates 146, 152. If C2Chd is greater than the selected C2Cv component, then the AND gates 150, 154 are inhibited and the ENhd(ENvc) command is generated. Otherwise the AND gates 150, 154 are enabled and the appropriate vertical enable command ENvd or ENvdm is generated according to the selected C2Cv component. These commands ENhd, ENvd and ENvdm determine the source of the Luma's Chroma limit value (FIG. 6F) and ENvc also determines whether the horizontal or vertical Luma's Chroma value (FIG. 6D) is used.

Figure 6H:
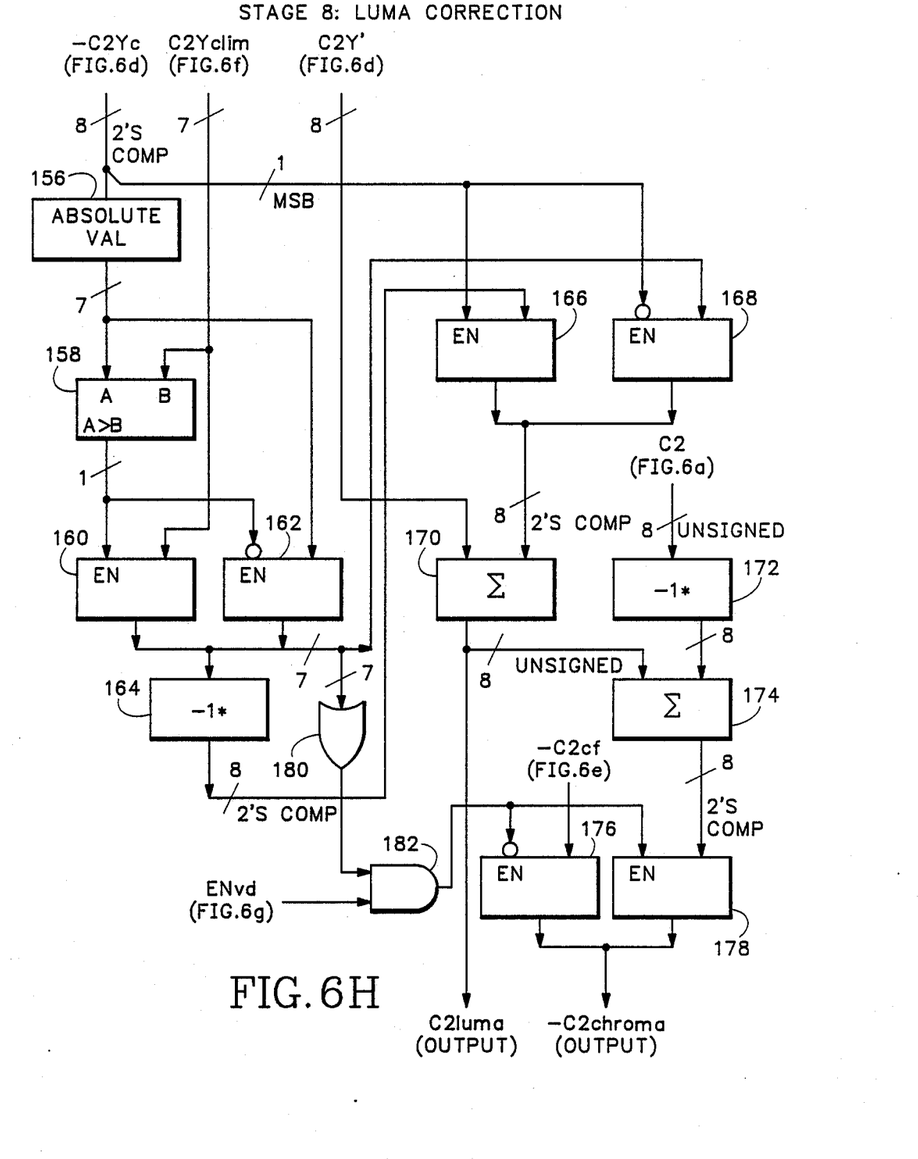

The final luminance correction is shown in FIG. 6H where the selected Luma's Chroma −C2Yc via absolute value circuit 156 is compared with the selected Chroma Mag value C2Yclim in comparator 158. Either the absolute value of −C2Yc or the C2Yclim value is passed through gates 160, 162 depending upon whether C2Yc is greater than C2Yclim. The output from gates 160, 162 is two's complemented by circuit 164, the output of which is input to gate 166, the unchanged output from the gates 160, 162 being input to gate 168. The gates 166, 168 are exclusively enabled according to the sign bit of −C2Yc. The output of the selected gate 166 or 168 is combined with C2Y', the initial luminance value for the central pixel, in summer 170 to produce the final corrected luminance output C2luma. The original Y+C value for C2 is subtracted from C2luma via two's complementer 172 and summer 174 to produce a final corrected chrominance output. Gates 176, 178 are exclusively enabled by the output of a command gate 182 so that the resulting decoded chroma value −C2chroma is either the corrected chrominance output from summer 174 or the initially determined chroma value −C2cf. The clipped Luma's Chroma output from the selected gate 160 or 162 is tested for a zero value by an OR gate 180 which is used to enable the command gate 182 when the not zero condition exists. The other input to the command gate 182 is ENvd. When the command gate 182 is enabled by both ENvd and the OR gate 180, the presence of a horizontal edge is indicated. As a result the command gate 182 disables gate 176 and enables gate 178, thus switching from the lower bandwidth chroma to the higher bandwidth chroma. Switching to the higher bandwidth chroma on all chroma edges can be accomplished by eliminating the command gate 182 and connecting the output of the OR gate 180 directly to gates 176, 178.

A device as described above is useful as part of a video decoder, either stand-alone or within a television set. "Burst" is the subcarrier reference in the encoded video signal. The phase relationship between the burst and the four points at which the encoded signal is sampled within each subcarrier cycle determines the chrominance components. By properly setting the phase relationship of the sampling relative to the burst for an NTSC encoded signal the two alternating components within the recovered chrominance signal would be I and Q. The rest of the process of decoding to the original red, green and blue signals is well known in the art.

The method described above also is useful when implemented as a computer program. As shown in FIG. 3B there are two frames consisting of four fields in the complete sequence of the NTSC encoded signal. Four fields of the NTSC signal can be digitized and stored in digital memory for repetitive conversion to analog form. This allows for the "capture" and continuous display of two frames of video without the need to decode the NTSC signal. Pictures within the memory can be altered or pictures can be generated entirely by computer and placed into the memory for display. A problem arises when video is captured from a source such as a television camera. If there is motion within the scene, it is likely that the two captured frames will not be identical. The visual appearance is that moving objects in the picture appear to shake. The solution is to dispose of one of the two frames and replace it with a copy of the remaining frame. Due to the subcarrier reversal between frames, one frame simply cannot be copied into the memory reserved for the other frame. Y+C pixels must be converted into Y−C pixels, and vice versa, before being placed into the memory for the other frame. By executing a computer program that implements the method described above, each pixel is separated into its luminance and chrominance components. The chrominance component is then phase reversed by negating its value. The phase reversed value is added to the luminance value, and the sum is stored in the corresponding memory location for the other frame. This is done for every pixel in the frame, thus eliminating motion by making the two frames identical.

Thus, the present invention provides for the more accurate decoding of luminance and chrominance from an encoded video signal by using weighted array of pixels from the same video field having the same chroma component to perform initial vertical and horizontal combing, and then performing luminance correction at the edges of chrominance transitions to reduce residual chrominance errors to obtain a more precise decoding for the luminance.

What is claimed is:

1. A method for decoding the luminance and chrominance components for each pixel of an encoded video image comprising the steps of:
   obtaining a weighted average for the chrominance component of each pixel by combing vertically and horizontally over an array of pixels centered on the pixel being decoded, the array of pixels being selected from a single field of the encoded video image and from pixels having the same chrominance component; and
   correcting the luminance component, obtained by subtracting the weighted average for the chrominance component from the encoded value for the pixel being decoded, as a function of a magnitude of chrominance change across an edge in the encoded video image and of the orientation of the edge.

2. A method as recited in claim 1 further comprising the step of subtracting the corrected luminance component from the encoded value for the pixel being decoded to obtain a corrected chrominance component.

3. A method as recited in claim 2 further comprising the steps of:
   detecting the edge in the encoded video image; and
   selecting the corrected chrominance component when the edge is detected and the weighted average chrominance component when the edge is not detected.

4. An apparatus for decoding the luminance and chrominance components for each pixel of an encoded video image comprising:
   means for obtaining a weighted average for the chrominance component of each pixel by combing vertically and horizontally over an array of pixels centered on the pixel being decoded, the array of pixels being selected from a single field of the encoded video image; and means for correcting the luminance component, obtained by subtracting the weighted average for the chrominance component from the encoded value for the pixel being decoded, as a function of a magnitude of chrominance change across an edge in the encoded video image and of the orientation of the edge.

5. An apparatus as recited in claim 4 further comprising means for subtracting the corrected luminance component from the encoded value for the pixel being decoded to obtain a corrected chrominance component.

6. An apparatus as recited in claim 5 further comprising:

means for detecting the edge in the encoded video image; and means for selecting the corrected chrominance component when the edge is detected and the weighted average chrominance component when the edge is not detected.

* * * * *